(12) United States Patent
Vangipuram (10) Patent No.: US 10,368,203 B1
(45) Date of Patent: Jul. 30, 2019

(54) SYSTEM AND A METHOD FOR ENTITY TRACKING

(71) Applicant: Cognizant Technology Solutions India Pvt. Ltd., Chennai (IN)

(72) Inventor: Ranga Vangipuram, Chennai (IN)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 0 days.

(21) Appl. No.: 15/980,934

(22) Filed: May 16, 2018

(30) Foreign Application Priority Data

Feb. 9, 2018 (IN) .............................. 201841005007

(51) Int. Cl.
*H04W 4/029* (2018.01)
(52) U.S. Cl.
CPC ................................... *H04W 4/029* (2018.02)
(58) Field of Classification Search
CPC ......... H04W 4/029; H04W 4/02; H04W 4/04; H04W 4/043; H04W 4/046
See application file for complete search history.

(56) References Cited

U.S. PATENT DOCUMENTS

| 6,614,392 | B2 | 9/2003 | Howard | |
|---|---|---|---|---|
| 7,681,921 | B2 | 3/2010 | Mercer | |
| 2013/0314210 | A1* | 11/2013 | Schoner | G06K 7/10366 340/8.1 |
| 2016/0295356 | A1* | 10/2016 | Schoner | G06K 7/10366 |
| 2018/0211179 | A1* | 7/2018 | Dzierwa | G06N 5/022 |

* cited by examiner

*Primary Examiner* — Khai M Nguyen
(74) *Attorney, Agent, or Firm* — Cantor Colburn LLP (57) ABSTRACT

A system and method for monitoring and tracking entities in one or more transit points is provided. The present invention provides for receiving one or more types of signaling functions associated with an entity in response to a code generated by a transmitter device. The code comprises a unique transmitter ID associated with a unique entity ID. Further, the invention provides for ascertaining validity of at least one type of signaling function and generating a time stamped record of at least one type of signaling function. Further, the invention provides for processing the code with tracking data to generate an event message. The tracking data comprises at least location of the entity along with other parameters associated with the entity. Further, the invention provides for extracting the unique entity ID and tracking data associated with the entity from the event message, and generating a tracking file.

24 Claims, 9 Drawing Sheets

FIG. 1

| Tracking Device Id | Time stamp of code | Key Serial (28 Bits) | Entity location | Function - Lock / Unlock | Signaling function Type - Audio/lighting |

FIG. 1A

CarKey Mapping

| Column Name | Column Type |
|---|---|
| car_id | Alphanumeric (32) |
| key_serial | Alphanumeric (64) |

Sample Data

| car_id | key_serial |
|---|---|
| 2T3ZF4DV6DW117311 | 1542713461753175371537135 7517 |
| 5T3ZF4DV7EW137515 | 8442713461753163416367185 7324 |
| 7T3ZF4DV5CW115013 | 5472472646726482648248959 2364 |

FIG. 1B

Tracking Details

| Column Name | Column Type |
|---|---|
| car_id | Alphanumeric (32) |
| timestamp | Long (UTC) |
| Car location | Lat, Lng (Double) |
| Tracking device_id | Alphanumeric (64) |
| event_type | entry, exit, tracking |

| car_id | timestamp | geofix | Tracking device_id | event_type |
|---|---|---|---|---|
| 2T3ZF4DV6DW117311 | 1500531455 | 12.90, 80.22 | 8RERWERJ23R23JFEWF | TRACKING |
| 5T3ZF4DV7EW137515 | 1410541544 | 9.92, 78.11 | 9REHW823EH3D8EFH3 | ENTRY |
| 7T3ZF4DV5CW115013 | 1430541242 | 12.74, 77.85 | HRE732E2N3R3E8FDWJ | EXIT |

Continuation FIG. 3

FIG. 4

SYSTEM AND A METHOD FOR ENTITY TRACKING

CROSS REFERENCE TO RELATED APPLICATION

This application is related to and claims the benefit of Indian Patent Application Number 201841005007 filed on Feb. 9, 2018, the contents of which are herein incorporated by reference in their entirety.

FIELD OF THE INVENTION

The present invention relates generally to the field of tracking entities. More particularly, the present invention relates to a system and a method for tracking entities positioned at any location or moving through one or more transit points efficiently and accurately.

BACKGROUND OF THE INVENTION

Presently, entities such as people, vehicles, machines, tools, materials, objects, etc. are monitored and tracked via physical elements such as RFID tags, biometrics, barcode tags and the like methods. Generally, barcodes may be used to track entry or exit of entities such as vehicles, machines, tools etc. through a transit point, such as a gate. In a typical example of vehicle transit from a factory to a dealer, barcodes with a unique code for each vehicle are coupled with respective vehicles. The transit of the vehicle from the factory to the dealer may include multiple transit sites such as factory yard, trucks, ports, ships, trains, etc. and the transit distance may vary from a few hundred miles to a thousands miles. At each transit site, the barcode is scanned using a barcode scanner by a person as the scanner needs to be held within a few inches of the barcode to scan the code correctly. Thereafter, the scanned code is transmitted from the scanner to a remote server through a communication channel for maintaining the transit details. However, tracking methods involving barcode scanning require a dedicated resource for scanning the barcode at each transit point. Further, barcode scanning requires the dedicated resource to be in close proximity with the scanner. Furthermore, barcode scanning is time consuming and a relatively slow technique.

In light of the above drawbacks, there is a need for a system and a method which can accurately track entities through one or more transit points or at any location. There is a need for a system and a method which does not require scanning of barcode attached to the entity and eliminates the need of a dedicated resource. Further, there is a need for a system and a method that does not require any modification or deployment of any additional device on the entities such as vehicles which are subject to tracking. Yet further, there is a need for a system and a method which can be easily implemented and reduces effort as well as time.

SUMMARY OF THE INVENTION

A tracking device for tracking one or more entities positioned at any location or moving through one or more transit points is provided. In various embodiments of the present invention, the tracking device interfaces with one or more sources associated with the entity. The tracking device comprises a memory storing program instructions, a processor configured to execute program instructions stored in the memory, and a data acquisition and message generation engine in communication with the processor. The tracking device is configured to receive one or more types of signaling functions associated with the entity from one or more sources in response to a code generated by an action performed on a transmitter device associated with the entity. The code comprises a transmitter ID associated with an entity ID of the entity. The tracking device evaluates time difference between the time of receiving the code and time of occurrence of the at least one type of signaling functions in respect to a predetermined time difference. Further, the tracking device generates a timestamped record of at least one type of signaling function in response to the results of the evaluation. Furthermore, the tracking device generates an event message for creating a tracking file by processing the received code with tracking data. The tracking data comprises one or more parameters associated with the entity and tracking device. The tracking device interfaces with a monitoring subsystem to create a tracking file. The tracking device transmits the event message to the monitoring subsystem, wherein the transmitter ID is extracted from the received event message and validity of the transmitter ID is ascertained based on a first set of rules. Further, a notification to a user terminal device is sent and a record of the event is created if the transmitter ID is invalid. Yet further, an entity ID associated with the transmitter ID is determined based on a second set of rules if the transmitter ID is valid. Finally, a tracking file is created for each event message to track the entity based on the entity ID.

A method for tracking an entity positioned at any location or moving through one or more transit points is provided. In various embodiments of the present invention, the method comprises receiving, by a first processor, one or more types of signaling functions associated with the entity from one or more sources in response to a code generated by an action performed on a transmitter device associated with the entity. The code comprises a transmitter ID associated with an entity ID of the entity. The method further comprises evaluating, by the first processor, time difference between the time of receiving the code and time of occurrence of at least one type of signaling function in respect to a predetermined time difference. Further, the method comprises generating, by the first processor, a timestamped record of at least one type of signaling functions in response to the results of the evaluation. Yet further, the method comprises generating, by the first processor, an event message for creating a tracking file by processing the received code with tracking data. The tracking data comprises one or more parameters associated with the entity and tracking device. Furthermore, the method comprises creating the tracking file which includes extracting, by a second processor, the transmitter ID from the received event message and ascertaining the validity of the transmitter ID based on a first set of rules. A notification to a user terminal device is sent and a record of the event is created if the transmitter ID is invalid. Further, the method comprises determining, by the second processor, an entity ID associated with the transmitter ID based on a second set of rules if the transmitter ID is valid. Finally the method comprises creating, by the second processor, a tracking file for each event message to track the entity based on the entity ID.

A computer program product is provided. The computer program product comprises a non-transitory computer-readable medium having computer-readable program code stored thereon, the computer-readable program code comprising instructions that, when executed by a processor, cause the processor to receive one or more types of signaling functions associated with the entity from one or more sources in response to a code generated by an action performed on a transmitter device associated with the entity. The code comprises a transmitter ID associated with an entity ID of the entity. Further, time difference between the time of receiving the code and time of occurrence of the at least one type of signaling functions in respect to a predetermined time difference is evaluated. Furthermore, a timestamped record of at least one type of signaling function in response to the results of the evaluation is generated. Finally, an event message for creating a tracking file by processing the received code with tracking data is generated. The tracking data comprises one or more parameters associated with the entity and tracking device.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for monitoring and tracking entities in one or more transit points. In particular, the present invention provides for receiving one or more types of signaling functions associated with an entity in response to a code generated by a transmitter device. The code comprises a unique transmitter ID associated with a unique entity ID. Further, the invention provides for ascertaining validity of at least one type of signaling function and generating a time stamped record of at least one type of signaling function. Further, the invention provides for processing the code with tracking data to generate an event message. The tracking data comprises at least location of the entity along with other parameters associated with the entity. Further, the invention provides for extracting the unique entity ID and tracking data associated with the entity from the event message, and generating a tracking file. The present invention may be utilized in a variety of applications where an entity passes through one or more transit points, for example: vehicles transported from a factory to a dealer via intermodal transportation, machinery transportation, vehicle tolling in a parking lot, employee logging into work as attendance system.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
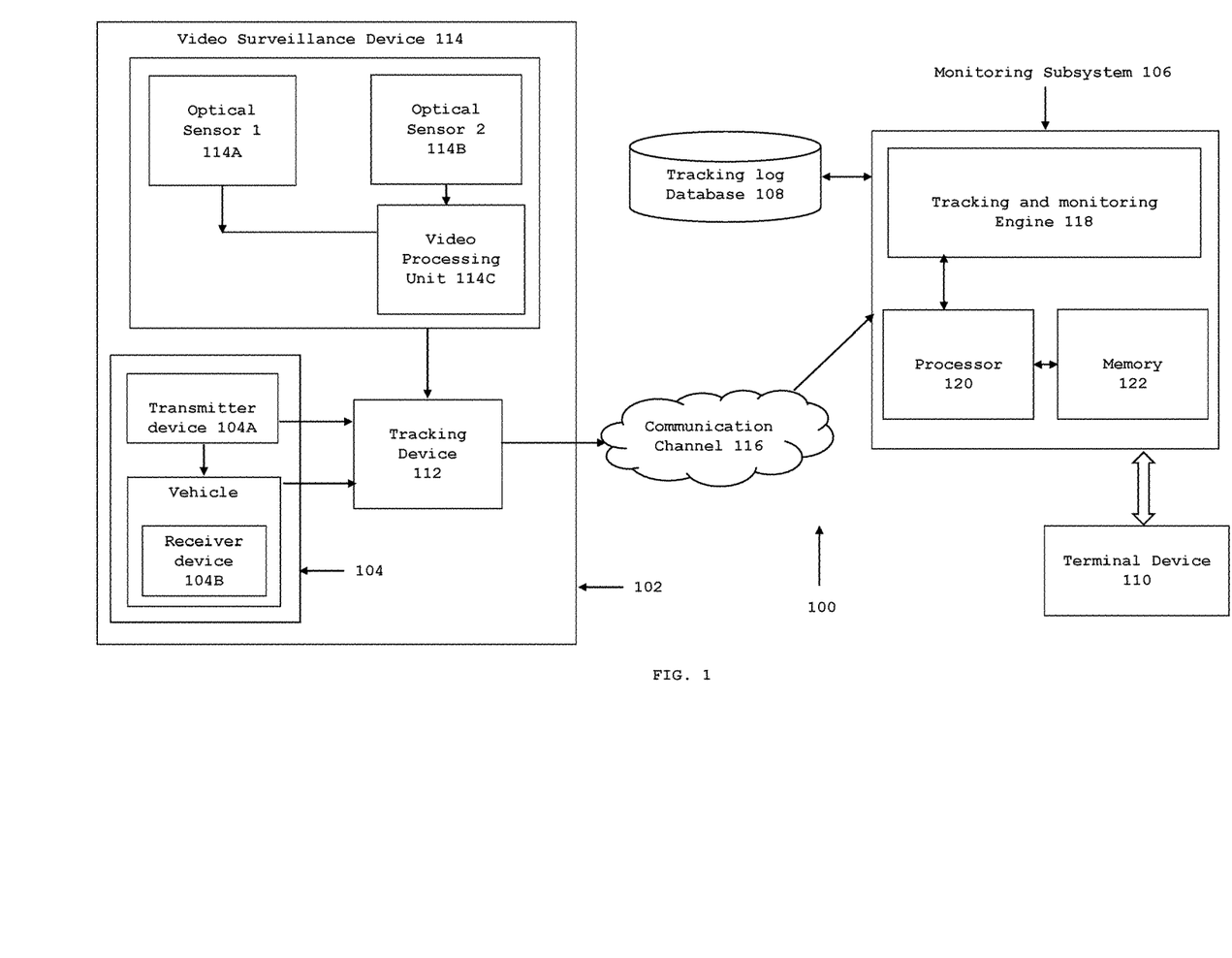
FIG. 1 illustrates a block diagram of a system for monitoring and tracking an entity positioned at any location or moving through one or more transit points, in accordance with various embodiments of the present invention.

FIG. 1 illustrates a block diagram of a system for monitoring and tracking an entity positioned at any location or moving through one or more transit points, in accordance with various embodiments of the present invention. Referring to FIG. 1, in an embodiment of the present invention, the system 100 comprises a transit point 102, an entity 104 such as a vehicle, a monitoring subsystem 106, a tracking log database 108 and a terminal device 110. The examples of transit point 102 may include a factory yard, a shipping port, a truck, a dealer yard or any point from where an entity 104 may be transported to another transit point. In another embodiment of the present invention, the transit point 102, may include a toll collection site or a parking lot. In an exemplary embodiment of the present invention, as shown in FIG. 1, the transit point 102 is a factory yard of a car manufacturer. In various embodiments of the present invention, the transit point 102 includes one or more tracking devices 112 disposed within the transit point 102. In another embodiment of the present invention, the tracking device 112 may be coupled with the entity 104. The tracking device 112 is described in detail in the later part of the specification.

Further, the transit point 102 includes one or more devices for capturing data from one or more sources (not shown) associated with the entity 104. The examples of one or more devices may include but are not limited to sensors such as optical sensors, acoustic sensors, other sensing devices capable of capturing data and video surveillance devices. In the exemplary embodiment of the present invention, as shown in FIG. 1, the one or more devices for capturing data from one or more sources associated with the entity are one or more video surveillance devices 114. In another embodiment of the present invention, the one or more devices for capturing data may be an optical sensor (not shown) and a video surveillance device 114.

In accordance with an embodiment of the present invention each of the one or more video surveillance devices 114 may comprise at least one or more optical sensors (e.g., video cameras) 114a and 114b, and a video processing unit 114c. The video surveillance device 114 may also include acoustic sensors (e.g., microphones) (not shown), motion sensors (not shown), video servers (not shown), and external or internal storage (not shown). In an exemplary embodiment of the present invention as shown in FIG. 1, the video surveillance device 114 includes multiple optical sensors 114a and 114b arranged for capturing footage of the entity 104 at desired angles in the transit point 102. For instance the optical sensors may be located overhead of the entity parking (e.g., on the ceiling of the to a transit point), the optical sensors may also be located at a front side of the entity parking (e.g., on a wall of the retail site). The optical sensors 114a and 114b are connected to the video processing unit 114c which converts the footage into a desired format and stores it for further use. It is to be understood that the embodiments of the present disclosure are not limited to a particular transit point location or type of entity.

The examples of the entity 104 may include vehicles such as cars, 2-wheelers, 3-wheelers, trucks etc., machinery, baggage, a person etc. In various embodiments of the present invention the entity 104 comprises one or more sources (not shown) to generate one or more types of signalling functions in response to a code received from a transmitter device. In an exemplary embodiment of the present invention, the examples of one or more sources associated with the entity 104 include but are not limited to audio signal generator and a light signal generator. Further, the transmitter device is associated with the entity 104 and is configured to generate the code on an action performed on the transmitter device. In the exemplary embodiment of the present invention, as shown in FIG. 1, the entity 104 is a car. The entity 104 comprises a transmitter device 104A exterior to the entity 104 and a receiver device 104B operably connected to the entity 104. The examples of the transmitter device 104A may include a key fob of the car, a mobile phone or any other device which can generate and transmit the code. Further, an authentication technique is required by the receiver device 104B to receive the code. The transmitter device 104A is assigned a unique transmitter ID associated with a unique entity ID assigned to the entity 104. The transmitter ID associated with the entity 104 is stored in the receiver device 104B. The transmitter device 104A is configured to generate and transmit the code, where the code comprises the transmitter ID associated with the entity 104 and data representative of one or more types of signaling functions associated with the entity 104. The receiver device 104B coupled with the entity 104 is configured to receive the code from the transmitter device 104A and validate the transmitter ID extracted from the code with the transmitter ID pre-stored in the receiver device 104B using one or more algorithms. Further, the entity 104 is configured to generate one or more types of signaling functions in response to the code received by the receiver device 104B. In an exemplary embodiment of the present invention, the types of signaling function includes but are not limited to an audio signal and a lighting signal.

In the exemplary embodiment of the present invention as shown in FIG. 1 the transmitter device 104A is configured to generate the code by using one or more algorithms. An example of code generation algorithm may include but is not limited to "KeeLoq code hopping algorithm". Further, the receiver device 104B is configured to perform locking and unlocking of the entity 104, where the entity 104 is configured to generate at least one of an audio signal and a lighting signal in response to the verification of the by the receiver device 104B.

In various embodiments of the present invention, the one or more tracking devices 112 interfaces with one or more video surveillance devices 114, the transmitter device 104A and one or more sources (not shown) associated with the entity 104. Each tracking device 112 is configured to receive the code generated by the transmitter device 104A. Further, the tracking device 112 is configured to receive one or more types of signalling functions associated with the entity 104 in response to the received code.

Further, the tracking device 112 is configured to compute the time of occurrence of at least one type of signaling function. In an exemplary embodiment of the present invention, the tracking device 112 receives one or more types of signaling functions from one or more sources associated with the entity 104. The tracking device 112 creates a first record of said one or more types of signaling functions. The tracking device 112 is configured to determine the time of occurrence of at least one type of signaling function based on the first record. Further, the tracking device 112 is configured to receive a second record of the signaling function from the video surveillance device 114 and determine the time of occurrence of the at least one type of signaling function based on the second record. The tracking device maps the first record of the signaling function with the second record to compute the time of occurrence of at least one type of signaling function.

The tracking device 112 is further configured to ascertain validity of at least one type of signaling function. In an exemplary embodiment of the present invention, the tracking device 112 is configured to evaluate time difference between the time of receiving the code and computed time of occurrence of one or more types of signaling function in respect to a predetermined time difference.

For example, the entity 104 which is a car, locks or unlocks in response to the received code. Further, an audio signal generator within the car generates an audio beep pattern in response to the code. In an exemplary embodiment of the present invention, a general pattern for locking of the car may include but is not limited to one beep and for unlocking may be two beeps. Further, the car generates lighting signals via lighting signal generator such as headlights or indicators. In an exemplary embodiment of the present invention, a general pattern for locking of the car may include but is not limited to flashing the lights both in front and rear of the car for approximately 300 milliseconds and then switch off. The same on-off sequence may be repeated twice for unlocking.

The tracking device 112, receives an audio record of the signalling function such as an audio beep generated by the car to determine a first time of occurrence of said signaling function. Further, the tracking device 112 retrieves the video record of the car generating audio beeps to determine a second time of occurrence of the signaling function. The tracking device maps the first record of the signaling function with the second record. The tracking device 112 analyses whether the first time of occurrence is equivalent to the second time of occurrence based on a predetermined lag time to compute the exact time of occurrence of the signaling function. Further, the tracking device 112 is configured to evaluate time difference between the time of receiving the code and computed time of occurrence of the signaling function in respect to a predetermined time difference. For instance, within one second of receiving the code, the car may produce an audio signal which may indicate that the car associated with the code is in the same location.

The tracking device 112, generates a timestamped record of the signaling function with respect to the computed time of occurrence of at least one signaling function subsequent to ascertaining the validity of said at least one signaling function.

The tracking device 112 is configured to determine the entity location to generate tracking data. In the exemplary embodiment of the present invention as shown in FIG. 1, the one or more tracking devices 112 are deployed within a range at the transit point 102. The location of the tracking device 112 receiving the code and one or more signaling functions is representative of the location of the entity 104 and one or more signalling functions. In an exemplary embodiment of the present invention, the tracking devices 112 may be deployed at the transit points 102 at a range of 30-70 s meter from the entity 104. The location of the tracking device 112 in said exemplary embodiment is representative of the approximate location of the entity 104.

In another exemplary embodiment of the present invention, where signalling function is at least a lighting signal, the tracking device 112 is configured to determine entity location based on the location of said signaling function. In operation, in an embodiment of the present invention, the tracking device 112 is configured to capture the coordinates of lighting signals associated with the entity 104 by analysing the retrieved video record of the signaling function based on the location of said tracking device 112. The tracking device 112, further analyses the layout of the transit point 102 via the video surveillance device 114 and determines the exact slot number for the co-ordinates by mapping the coordinates of the lighting signals to the slot number. This slot number is representative of the exact location of the entity 104.

The tracking device 112 processes the received code with tracking data to generate an event message. The tracking data comprises one or more parameters associated with the entity 104 and the tracking device 112. In an exemplary embodiment of the present invention, the one or more parameters associated with the entity 104 include but are not limited to entity location, type of signalling function, time stamped record of the signalling function and pattern of signalling function. In an exemplary embodiment of the present invention, the one or more parameters associated with the tracking device 112 include tracking device ID and tracking device location.

Figure 1A:
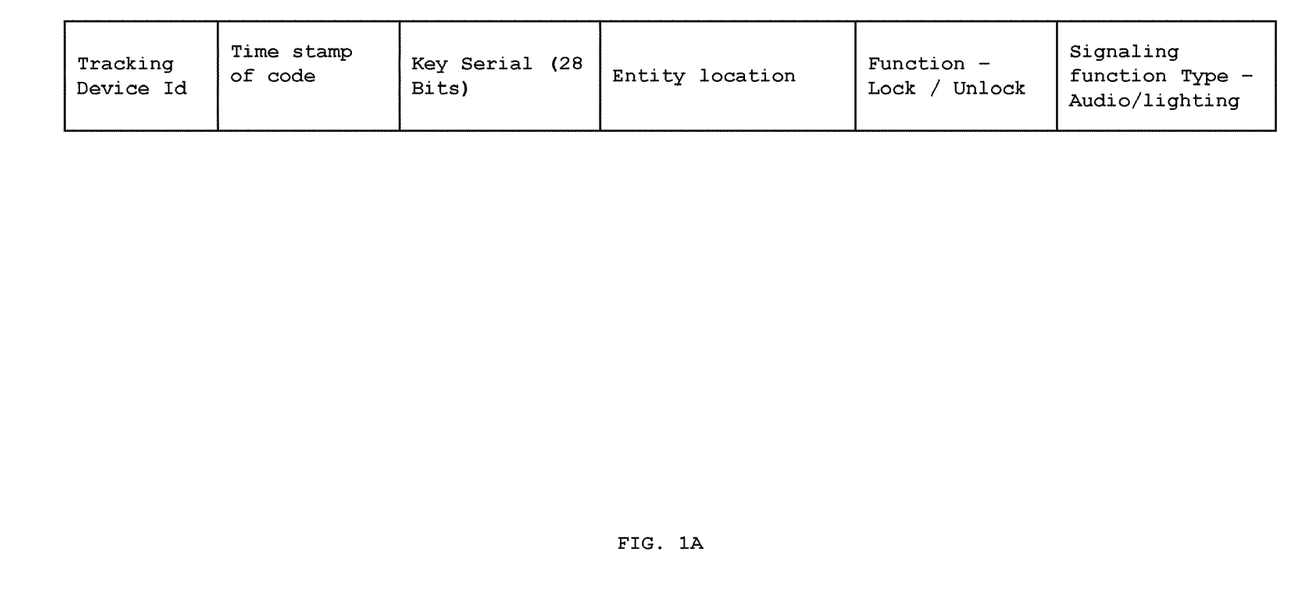
FIG. 1A is an exemplary table depicting an event message, in accordance with an exemplary embodiment of the present invention.

In an exemplary embodiment of the present invention, the event message comprises received code, time of receiving the code, tracking device ID, tracking device location, entity location, type of signaling function, timestamped record of signaling function and pattern of signaling function. An exemplary table depicting the event message is shown in FIG. 1A, in accordance with an exemplary embodiment of the present invention. Further, the tracking device 112 is configured to transmit the generated event message to the monitoring subsystem 106.

In an exemplary embodiment of the present invention the monitoring subsystem 106 interfaces with one or more tracking devices 112 over a communication channel 116. Further, the monitoring subsystem 106 interfaces with the tracking log database 108 and a terminal device 110 over a second communication channel (not shown). The communication channel 116 may include a physical transmission medium, such as, a cable, or a logical connection over a multiplexed medium, such as, a radio channel in telecommunications and computer networking. The examples of radio channel in telecommunications and computer networking may include a Local Area Network (LAN), a Metropolitan Area Network (MAN), a Wide Area Network (WAN). The monitoring subsystem 106 may be located at the the transit point or may be located at a site remote to the transit point 102.

Further, the monitoring subsystem 106 comprises a monitoring and tracking engine 118, a processor 120 and a memory 122. The monitoring and tracking engine 116 is configured to automatically analyze and validate complex code, extract transmitter ID associated with the entity ID, determine entity ID associated with extracted transmitter ID, validate the extracted transmitter ID, extract tracking data from event message and create a tracking file associated with the entity 104. In an exemplary embodiment of the present invention, the tracking file includes but is not limited to tracking device ID, entity location, type of signaling function, event type (entry or exit), event time and entity ID associated with the entity 104. Further, said engine 116 is configured to update the tracking file till the entity 104 reaches the desired destination and maintain the tracking file in the tracking log database 108 for tracking the entity 104.

In various embodiments of the present invention the tracking log database 108 may be maintained in a storage server which is remote to the monitoring subsystem 106, or may be maintained in a separate storage in the monitoring subsystem 106. In an embodiment of the present invention, the tracking log database 108 may be updated with tracking file in real-time. Further, the tracking log database 108 comprises a knowledge base of the transmitter ID and associated entity ID.

In various embodiments of the present invention, the tracking and monitoring engine 118 is configured to receive one or more event messages from the one or more tracking devices 112. Further, the tracking and monitoring engine 118 is configured to extract the code and tracking data associated with the entity 104 from the event message. The tracking and monitoring engine 118, extracts the transmitter ID from the code. The tracking and monitoring engine 118 performs a check to determine if the code received from the transmitter device 104A is from a spurious transmitter device of a hacker based on a first set of rules. In an exemplary embodiment of the present invention, the first set of rules comprises ascertaining the validity of the extracted transmitter ID from a list of activated transmitter ID's maintained in the tracking log database 108. If the transmitter ID is not found in the list, the transmitter device is considered spurious and is rejected. Further, a record of the spurious event message is maintained in the tracking log database 108 for future investigation.

Figure 1B:
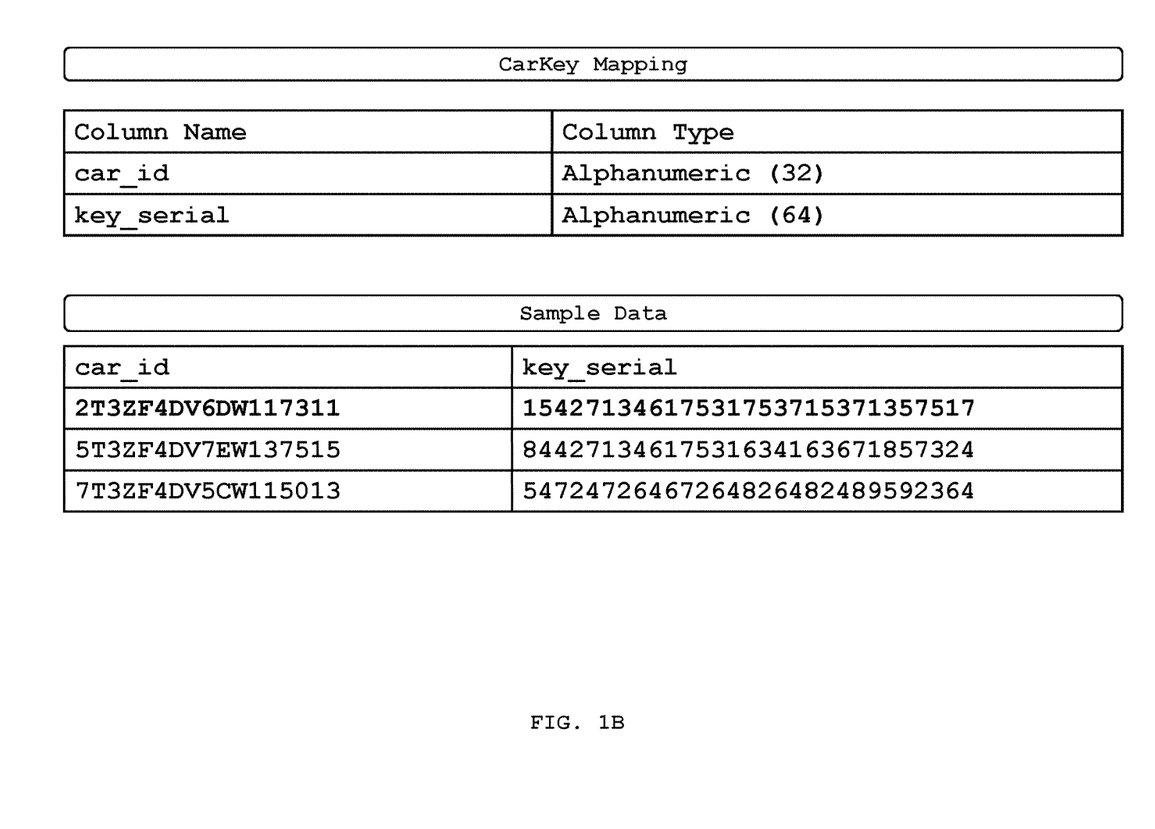
FIG. 1B is an exemplary table depicting a transmitter-entity knowledge base, in accordance with an exemplary embodiment of the present invention.

Further, if the transmitter ID is valid, the tracking and monitoring engine 118 is configured to determine the entity ID associated with extracted transmitter ID based on a second set of rules. In an exemplary embodiment of the present invention, the second set of rules comprises mapping the extracted transmitter ID with the associated entity ID from a transmitter_entity knowledge base maintained in the tracking log database 108. An exemplary table depicting transmitter_entity knowledge base is shown in FIG. 1B. Furthermore, the tracking and monitoring engine 118 is configured to generate a tracking file for each event message to track the entity 104. The tracking file includes but is not limited to tracking device ID, entity location, signaling function type, event type, event time and entity ID associated with the entity 104. For e.g.: in the exemplary embodiment of the invention in which the entity 104 is a car, the car ID associated with the car is representative of VIN number provided by the car manufacturer.

Figure 1C:
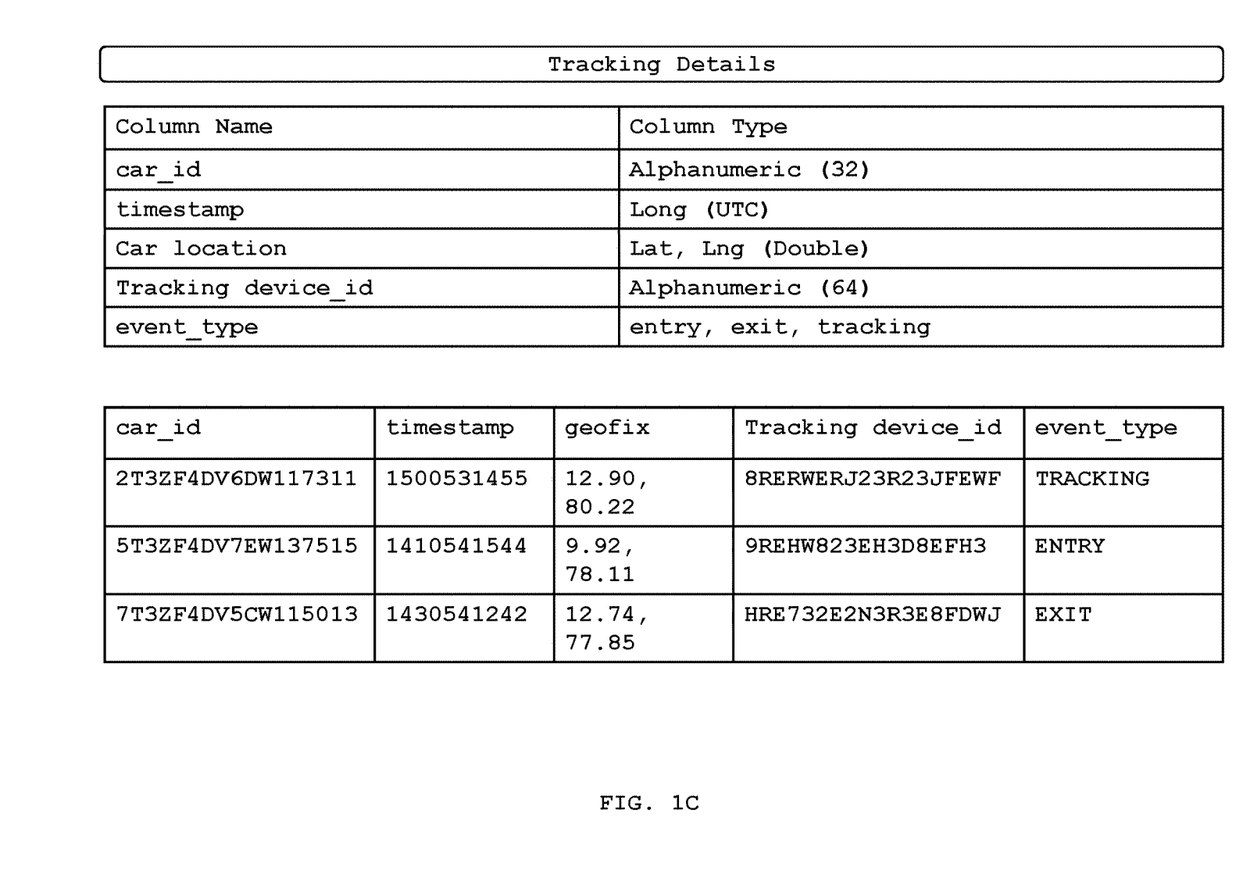
FIG. 1C is an exemplary table depicting a tracking file for the event message, in accordance with an exemplary embodiment of the present invention.

In the exemplary embodiment of the present invention, where the entity 104 is a car, the tracking and monitoring engine 118 extracts transmitter ID from the event message and determines the corresponding CarID. The tracking and monitoring engine 118, further extracts tracking data from the event message and generates a tracking file as shown in FIG. 1C. In operation in the exemplary embodiment of the present invention, the entry event of car in a transit point is initiated by locking of the car and the entry event ends by immediate unlocking of the car. Similarly, the exit event of the car from a transit point is initiated by locking of the car and the exit event ends by immediate unlocking of the car. An exemplary table depicting the tracking file for an event message is shown in FIG. 1C.

Figure 1D:
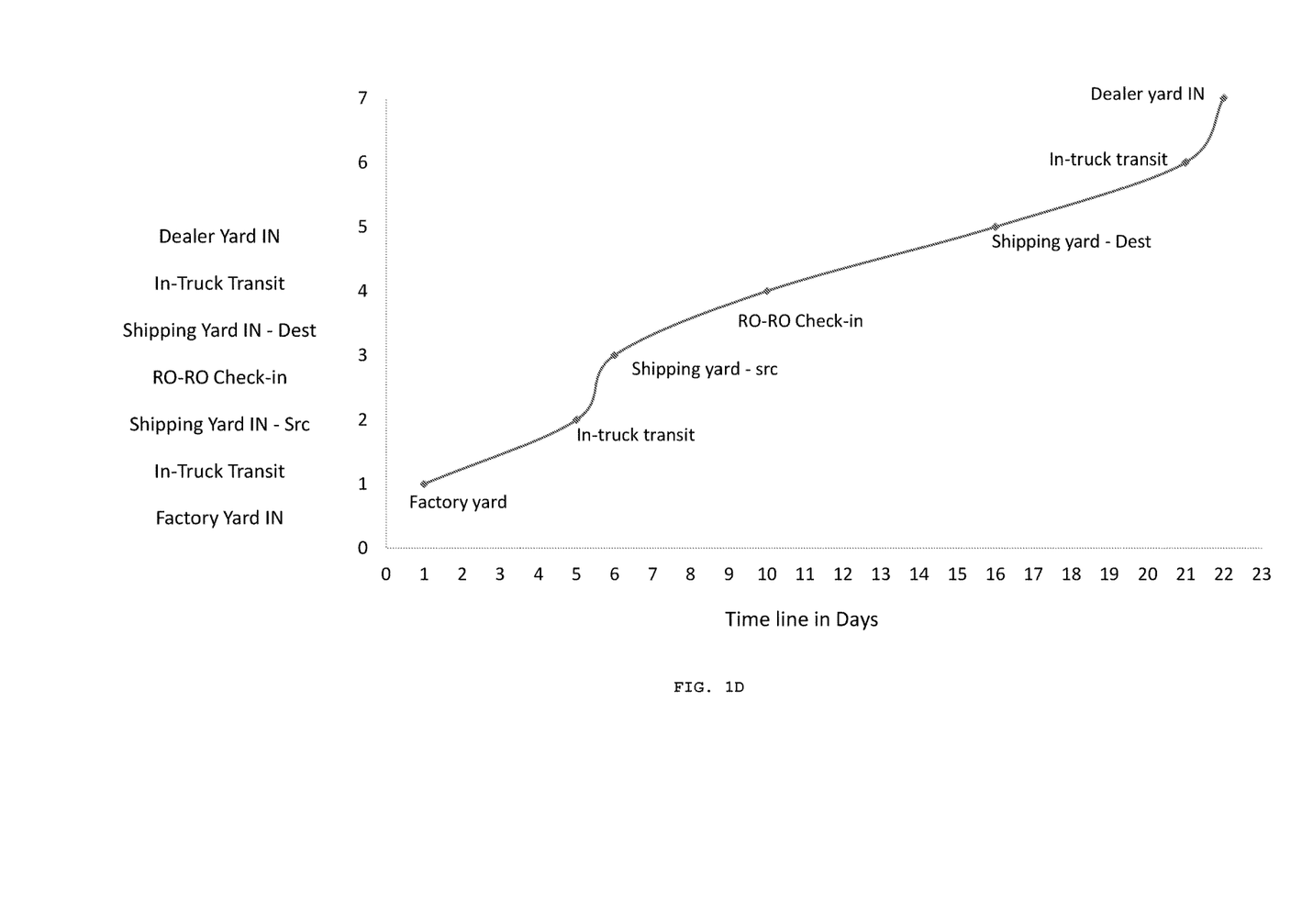
FIG. 1D is an exemplary representation of the entity being tracked through one or more transit points displayed on a terminal device, in accordance with an exemplary embodiment of the present invention.

Further, the tracking and monitoring unit 118 is configured to update the tracking file for every event message and transmit the tracking file to the terminal device 110. In an exemplary embodiment of the present invention, the tracking file may be depicted as a graphical representation of the entity 104 through one or more transit points 102 on the display of the terminal device 110, as shown in FIG. 1D. The terminal device 110 may include but is not limited to a smart phone, a computer, a tablet, microcomputer or any other wired or wireless terminal.

In an embodiment of the present invention, the monitoring subsystem 106 may be accessed by the terminal device 110 to fetch tracking details of the entity 104 based on the entity ID. In another embodiment of the present invention, the monitoring subsystem 106 may be accessed by the terminal device 110 to fetch the tracking details of the entity 104 based on the transit point details.

In another embodiment of the present invention, the monitoring subsystem 106 may be implemented in a cloud computing architecture in which data, applications, services, and other resources are stored and delivered through shared data-centers. In an exemplary embodiment of the present invention, the functionalities of the subsystem 106 are delivered to the terminal device 110 over the communication network.

In an exemplary embodiment of the present invention the one or more tracking devices 112 and terminal devices 110 may be configured with a user interface (not shown) of the monitoring subsystem 106 to facilitate the authorities retrieve the tracking file, detailed reports of the entity location. The user-interface (not shown) may be customized as per the site of application of the system 100.

Figure 2:
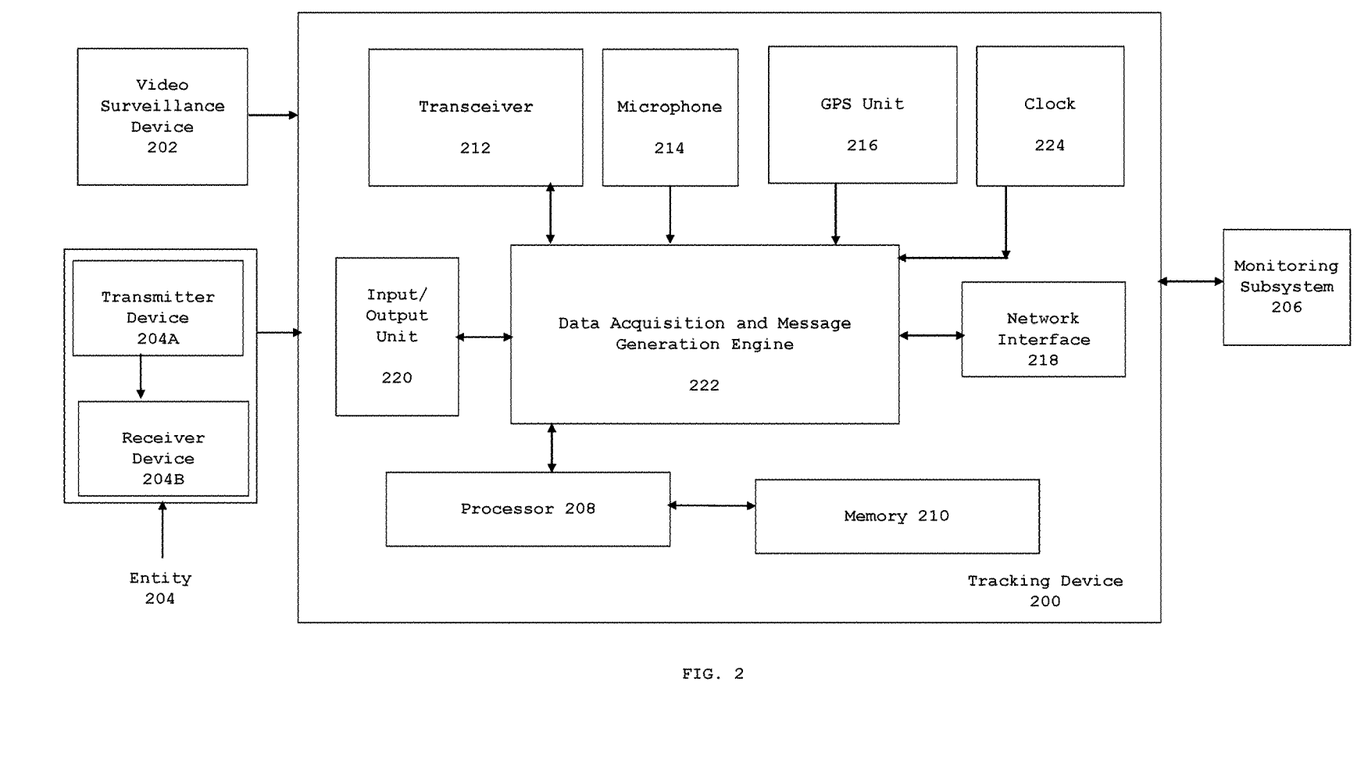
FIG. 2 is a detailed block diagram of a tracking device, in accordance with various embodiments of the present invention.

FIG. 2 is a detailed block diagram of a tracking device, in accordance with various embodiments of the present invention. The tracking device 200 interfaces with a video surveillance device 202, a transmitter device 204A and one or more sources (not shown) associated with the entity 204 and a monitoring subsystem 206. The tracking device 200 has multiple units which work in conjunction with each other to generate an event message comprising tracking data associated with the entity 204. The various units of the tracking device 200 are operated via the processor 208 specifically programmed to execute instructions stored in memory 210 for executing respective functionalities of the units of the tracking device 200 in accordance with various embodiments of the present invention. The tracking device 200 comprises a transceiver 212, a microphone 214, a GPS unit 216, a network interface 218, an input/output unit 220, a data acquisition and message generation engine 222 and a clock 224.

In various embodiments of the present invention, the transceiver 212 is configured to receive a code generated by the transmitter device 204A. In an exemplary embodiment of the present invention, the transceiver 212 is capable of receiving the code via a radio frequency signal or an Infra-red signal or any other wireless communication.

The microphone 214 is configured to receive audio signals produced by the entity 204 and convert the audio signals into electrical signals. The GPS unit 216 is configured to determine and record the location of the tracking device 200. In an exemplary embodiment of the present invention, the GPS unit is configured to record the location of the tracking device 200 in terms of latitude and longitude.

The network interface 218 may further comprise at least one of Wi-Fi module (not-shown) and internet connection ports (not shown). The network interface 218 is configured to transmit data to the monitoring subsystem 206 via communication channel (not shown).

The input/output unit 220 is configured to receive inputs from a user. Further, the input/output device is configured to display tracking details associated with the entity 204. The examples of input/output unit 220 include but are not limited to a display screen with a key pad, a touch screen etc.

In various embodiments of the present invention, the data acquisition and message generation engine 222 is configured to operate the various units of the tracking device 200 for executing respective functionalities of said units.

The data acquisition and message generation engine 222 is configured to receive a code generated by the transmitter device 204A via the transceiver 212. In an exemplary embodiment of the present invention, said The transmitter device is a key Fob of a car and the code is generated by performing an action on the key Fob, such as pressing of keys of key Fob. Further, the data acquisition and message generation engine 222 is configured to receive one or more types of signalling functions associated with the entity 204 in response to the received code.

Further, the data acquisition and message generation engine 222 is configured to compute the time of occurrence of at least one type of signaling function. In an exemplary embodiment of the present invention, the data acquisition and message generation engine 222 receives one or more types of signaling functions from one or more sources associated with the entity 204. The data acquisition and message generation engine 222 creates a first record of said one or more types of signaling functions. The data acquisition and message generation engine 222 is configured to determine the time of occurrence of at least one type of signaling function based on the first record. In operation, the data acquisition and message generation engine 222 analyses the time of creation of the first record via the clock 224 and determine the time of occurrence of the signalling function. Further, the data acquisition and message generation engine 222, is configured to receive a second record of the signaling function from the video surveillance device 202 and determine the time of occurrence of the at least one type of signaling function based on the second record. The data acquisition and message generation engine 222 maps the first record of the signaling function with the second record to compute the time of occurrence of at least one type of signaling function.

The data acquisition and message generation engine 222 is further configured to ascertain validity of at least one type of signaling function. In an exemplary embodiment of the present invention, the data acquisition and message generation engine 222 is configured to evaluate time difference between the time of receiving the code and computed time of occurrence of one or more types of signaling function in respect to a predetermined time difference.

For example, the entity 204 which is a car, locks or unlocks in response to the received code. Further, an audio signal generator within the car generates an audio beep pattern in response to the code. In an exemplary embodiment of the present invention, a general pattern for locking of the car may include but is not limited to one beep and for unlocking may be two beeps. Further, the car generates lighting signals via lighting signal generator such as headlights or indicators. In an exemplary embodiment of the present invention, a general pattern for locking of the car may include but is not limited to flashing the lights both in the front and rear of the car for approximately 300 milliseconds and then switch off. The same on-off sequence may be repeated twice for unlocking.

The data acquisition and message generation engine 222, receives an audio record of the signalling function such as an audio beep generated by the car to determine a first time of occurrence of said signaling function. Further, the data acquisition and message generation engine 222, retrieves the video record of the car generating audio beeps to determine a second time of occurrence of the signaling function. The data acquisition and message generation engine 222, maps the first record of the signaling function with the second record. The data acquisition and message generation engine 222, analyses whether the first time of occurrence is equivalent to the second time of occurrence based on a predetermined lag time to compute the exact time of occurrence of the signaling function. Further, the data acquisition and message generation engine 222 is configured to evaluate time difference between the time of receiving the code and computed time of occurrence of the signaling function in respect to a predetermined time difference. For instance, within one second of receiving the code, the car may produce an audio signal which may indicate that the car associated with the code is in the same location.

Further, the data acquisition and message generation engine 222, generates a timestamped record of the signaling function with respect to the computed time of occurrence of at least one signaling function subsequent to ascertaining the validity of said at least one signaling function.

Further, the data acquisition and message generation engine 222 is configured to determine the entity location to generate tracking data. The one or more tracking devices 200 are deployed within a range at the transit point (not shown). The location of the tracking device 200 receiving the code and one or more signaling functions is representative of the location of the entity 204 and one or more signalling functions. Therefore, the data acquisition and message generation engine 222 retrieves the location of the tracking device 200 via the GPS unit 216. In an exemplary embodiment of the present invention, the tracking device 200 is configured to receive the code generated by the transmitter device 204A in a range of 30 to 70 meters. The location of the tracking device 200 in said exemplary embodiment is representative of the approximate location of the entity 204.

In another embodiment of the present invention, the tracking device 200 may be coupled with the entity 204 or may be placed inside the entity 204. Therefore, the location of the tracking device 200 is representative of exact location of the entity 204. For E.g.: the entity 204 which is a car, locks/unlocks in response to the code received by pressing of keys on the transmitter device 204A which is a key fob by a user. The user may carry the tracking device 200 in its pocket, while pressing the keys of the key fob inside the car. The tracking device 200 and the key fob are in the range of 1 meter from each other and the location of the tracking device 200 is representative of exact location of the events and the entity 204.

In another exemplary embodiment of the present invention, where signalling function is at least a lighting signal, the data acquisition and message generation engine 222 is configured to determine entity location based on the location of said signaling function. In operation, in an embodiment of the present invention, the data acquisition and message generation engine 222 retrieves the location of the tracking device 200 via the GPS unit 216. Further, the data acquisition and message generation engine 222 is configured to capture the coordinates of lighting signals associated with the entity 204 by analysing the retrieved video record of the signaling function based on the retrieved location of the tracking device 200. The data acquisition and message generation engine 222, further analyses the layout of the transit point (not shown) via the video surveillance device 202 and determines the exact slot number for the co-ordinates by mapping the coordinates of the lighting signals to the slot number. This slot number is representative of the exact location of the entity 204.

The data acquisition and message generation engine 222 processes the received code with tracking data to generate an event message. The tracking data comprises one or more parameters associated with the entity 104 and the tracking device 112. In an exemplary embodiment of the present invention, the one or more parameters associated with the entity 104 include but are not limited to entity location, type of signalling function, time stamped record of the signalling function and pattern of signalling function. In an exemplary embodiment of the present invention, the one or more parameters associated with the tracking device 112 include tracking device ID and tracking device location.

In an exemplary embodiment of the present invention, the event message comprises received code, time of receiving the code, tracking device ID, tracking device location, entity location, type of signaling function, timestamped record of signaling function and pattern of signaling function. Further, the data acquisition and message generation engine 222 is configured to transmit the generated event message to the monitoring subsystem 206.

Figure 3:
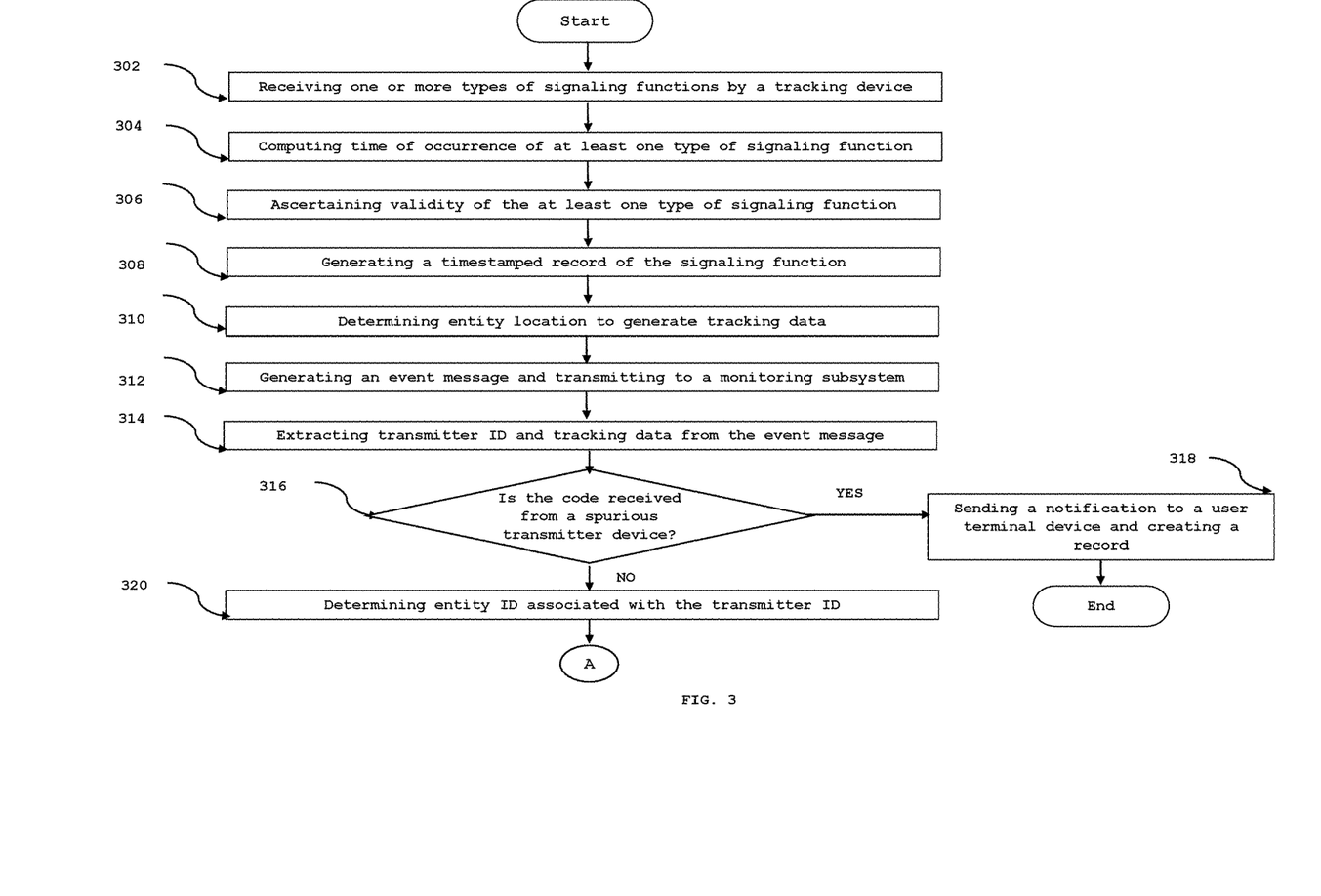
FIG. 3 is a flowchart illustrating a method for monitoring and tracking an entity positioned at any location or moving through one or more transit points, in accordance with various embodiments of the present invention.

FIG. 3 is a flowchart illustrating a method for, monitoring and tracking an entity positioned at any location or moving through one or more transit points, in accordance with various embodiments of the present invention. The transit point may include, for example, a factory yard, a shipping port, a truck, a dealer yard or any point from where an entity may be transported to another transit point. In another embodiment of the present invention, the transit point, may include a toll collection site at a parking lot. In an exemplary embodiment of the present invention, as shown in FIG. 1, the transit point is a factory yard of a car manufacturer. In various embodiments of the present invention, the transit point comprises one or more tracking devices and one or more video surveillance devices.

The examples of the entity 104 may include vehicles such as cars, 2-wheelers, 3-wheelers, trucks etc., machinery, baggage, a person etc. In various embodiments of the present invention the entity 104 comprises one or more sources (not shown) to generate one or more types of signalling functions in response to a code received from a transmitter device. In an exemplary embodiment of the present invention, the examples of one or more sources associated with the entity 104 include but are not limited to audio signal generator and a light signal generator. Further, the transmitter device is associated with the entity 104 and is configured to generate the code on an action performed on the transmitter device. In the exemplary embodiment of the present invention, the entity 104 is a car. The entity 104 comprises a transmitter device exterior to the entity and a receiver device operably connected to the entity. The examples of the transmitter device may include a key fob of the car, a mobile phone or any other device which can generate and transmit the code. Further, an authentication technique is required by the receiver device to receive the code. The transmitter device is assigned a unique transmitter ID associated with a unique entity ID assigned to the entity. The transmitter ID associated with the entity is stored in the receiver device. The transmitter device is configured to generate and transmit the code, where the code comprises the transmitter ID associated with the entity and data representative of one or more types of signaling functions associated with the entity. The receiver device coupled with the entity is configured to receive the code from the transmitter device and validate the transmitter ID extracted from the code with the transmitter ID pre-stored in the receiver device using one or more algorithms. Further, the entity is configured to generate one or more types of signaling functions in response to the code received by the receiver device. In an exemplary embodiment of the present invention, the types of signaling function includes but are not limited to an audio signal and a lighting signal. In the exemplary embodiment of the present invention the transmitter device is configured to generate the code by using one or more algorithms. An example of code generation algorithm may include but is not limited to "KeeLoq code hopping algorithm". Further, the receiver device is configured to perform locking and unlocking of the entity, where the entity is configured to generate at least one of an audio signal and a lighting signal in response to the verification of the by the receiver device.

At step 302, one or more types of signaling functions are received. In particular, the code generated by the transmitter device is received by the tracking device. Further, one or more types of signaling functions associated with the entity are received in response to the received code. In an exemplary embodiment of the present invention, the code comprises the transmitter ID associated with the entity and data representative of one or more types of signaling functions associated with the entity.

At step 304, time of occurrence of at least one type of signaling function is computed. In an exemplary embodiment of the present invention, one or more types of signaling functions are received by the tracking device from one or more sources associated with the entity. A first record of said one or more types of signaling functions is created by the tracking device. The time of occurrence of at least one type of signaling function is determined by the tracking device 112 based on the first record. Further, a second record of the signaling function is received by the tracking device from the video surveillance device. The time of occurrence of at least one type of signaling function is determined by the tracking device based on the second record. Further, the first record of the signaling function is mapped with the second record to compute the time of occurrence of at least one type of signaling function.

At step 306, validity of at least one type of signaling function is ascertained. In particular, the time difference between the time of receiving the code and computed time of occurrence of one or more types of signaling functions is evaluated by the tracking device in respect to a predetermined time difference.

At step 308, a timestamped record of a signaling function is generated. In an exemplary embodiment of the present invention, a timestamped record of the signaling function is generated with respect to the computed time of occurrence of at least one signaling function subsequent to ascertaining the validity of said at least one signaling function.

At step 310, entity location is determined to generate tracking data. In particular, the location of the tracking device receiving the code and one or more signaling functions is representative of the location of the entity and one or more signalling functions as the tracking devices are deployed in the transit points within a range of the entity. In an embodiment of the present invention, the range may be 30-70 meters.

At step 312, an event message is generated and transmitted to a monitoring subsystem. In particular, the received code is processed with tracking data to generate an event message by the tracking device. The tracking data comprises one or more parameters associated with the entity and the tracking device. In an exemplary embodiment of the present invention, the one or more parameters associated with the entity include but are not limited to entity location, type of signalling function, time stamped record of the signalling function and pattern of signalling function. In an exemplary embodiment of the present invention, the one or more parameters associated with the tracking device include tracking device ID and tracking device location.

In an exemplary embodiment of the present invention, the event message comprises received code, time of receiving the code, tracking device ID, tracking device location, entity location, type of signaling function, timestamped record of signaling function and pattern of signaling function. Further, the generated event message is transmitted to the monitoring subsystem by the tracking device.

At step 314, transmitter ID and tracking data is extracted from the event message. In particular the transmitter ID embedded in the code along with tracking data associated with the entity is extracted from the event message by the monitoring subsystem.

At step 316, a check is performed by the monitoring subsystem to determine if the code received from the transmitter device is from a spurious transmitter device of a hacker based on a first set of rules. In an exemplary embodiment of the present invention, the first set of rules comprises validating the extracted transmitter ID from a list of activated transmitter ID's maintained in a tracking log database. If the transmitter ID is not found in the list, then the transmitter is considered spurious.

At step 318, if it is determined that the code is from a spurious transmitter device, a notification is sent to a user terminal device and a record is created in the tracking log database by the monitoring subsystem.

At step 320, if it is determined that the code from a valid transmitter device, the entity ID associated with the transmitter ID is determined. In particular, the entity ID associated with extracted transmitter ID is determined by the monitoring subsystem based on a second set of rules. In an exemplary embodiment of the present invention, the second set of rules comprises mapping the extracted transmitter ID with the associated entity ID from a transmitter_entity knowledge base maintained in the tracking log database to determine the entity ID.

At step 322, a tracking file for each event message is generated. In an embodiment of the present invention, the tracking file for each event message is generated by the monitoring unit to track the entity. Further the tracking file is stored and maintained in a database. The tracking file includes but is not limited to tracking device ID, location data, type of signaling function, event type (entry or exit), event time and entity ID associated with the entity.

At step 324, the tracking file is updated for every event message by the monitoring subsystem and transmitted to the user terminal device.

Figure 4:
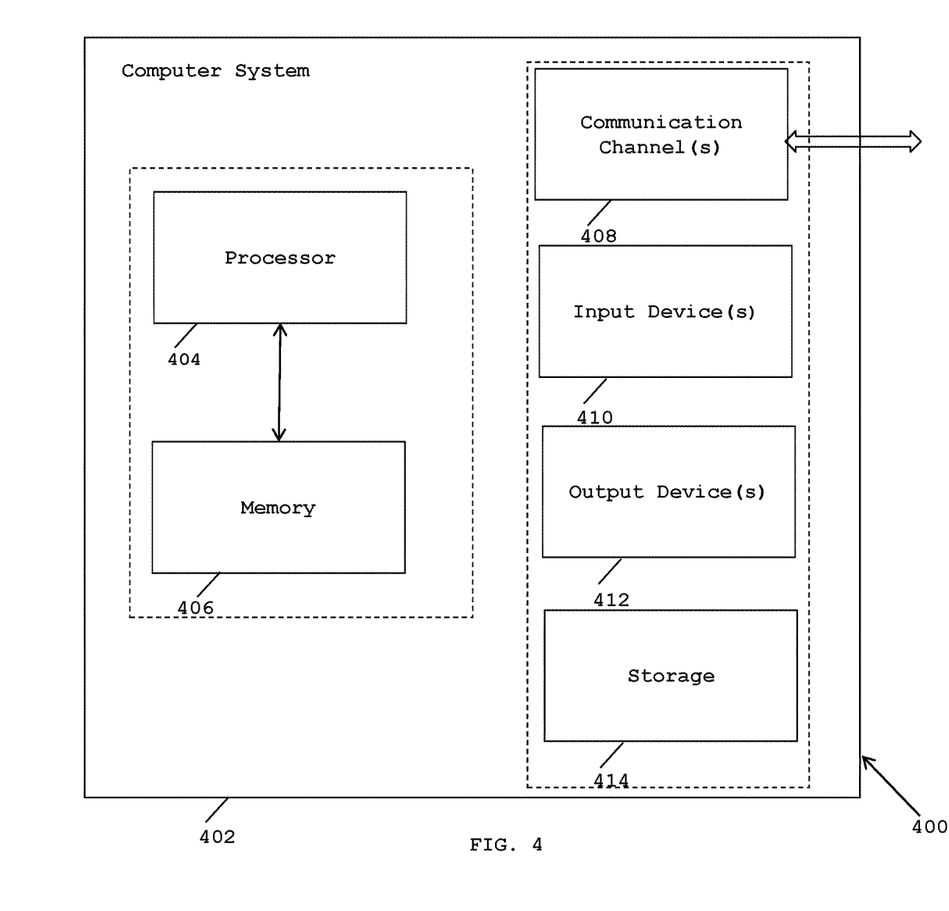
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 302.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

I claim:

1. A tracking device for tracking one or more entities positioned at any location or moving through one or more transit points, the tracking device interfacing with one or more sources associated with the entity, the tracking device comprising:

a memory storing program instructions; a processor configured to execute program instructions stored in the memory; and a data acquisition and message generation engine in communication with the processor and configured to:

receive one or more types of signaling functions associated with the entity from one or more sources in response to a code generated by an action performed on a transmitter device associated with the entity, wherein the code comprises a transmitter ID associated with an entity ID of the entity;

evaluate time difference between the time of receiving the code and time of occurrence of the at least one type of signaling functions in respect to a predetermined time difference, wherein computing the time of occurrence of the at least one type of signaling function comprises:

retrieving time of occurrence of the at least one signaling function from a first record of the signaling function;

retrieving time of occurrence of the at least one signaling function from a second record of the signaling function;

mapping the first record of the at least one signaling function with the second record of the at least one signaling function; and computing exact time of occurrence of the at least one signaling function by comparing the time of occurrences retrieved from the first and the second records based on a predetermined time lag;

generate a timestamped record of at least one type of signaling function in response to the results of the evaluation; and generate an event message for creating a tracking file by processing the received code with tracking data, wherein the tracking data comprises one or more parameters associated with the entity and tracking device.

2. The tracking device as claimed in claim 1, wherein generating the time stamped record of at least one type of signaling function comprises computing the time of occurrence of the at least one type of signaling function and ascertaining validity of said signaling functions based on the evaluated time difference.

3. The tracking device as claimed in claim 1, wherein one or more sources associated with the entity include audio signal generator and light signal generator.

4. The tracking device as claimed in claim 1, wherein the types of signaling functions associated with the entity include audio signals and lighting signals.

5. The tracking device as claimed in claim 1, wherein the one or more parameters associated with the entity include entity location, type of signaling function, timestamped record of signaling function and pattern of signaling function.

6. The tracking device as claimed in claim 5, wherein the one or more parameters associated with the tracking device include tracking device ID and tracking device location.

7. The tracking device as claimed in claim 6, wherein the event message comprises received code, time of receiving the code, tracking device ID, tracking device location, entity location, type of signaling function, timestamped record of signaling function and pattern of signaling function.

8. The tracking device as claimed in claim 1, wherein the tracking device is configured to determine the entity location based on the location of the tracking device, wherein location of the tracking device is representative of location of the entity and one or more types of signaling functions associated with the entity.

9. The tracking device as claimed in claim 1, wherein the tracking device is configured to determine the entity location based on the location of the signaling function, the signaling function being a lighting signal, determining the location of the entity comprises:
   retrieving location of the tracking device;
   capturing the coordinates of the lighting signals by analysing a video record of the lighting signal based on the location of the tracking device, said video record retrieved via a video surveillance device deployed at the transit point;
   analysing the layout of the transit point via the video surveillance device; and
   determining the exact slot number for the co-ordinates by mapping the coordinates of the lighting signals with the slot number, wherein the slot number is representative of the exact location of the entity.

10. The tracking device as claimed in claim 1, wherein the tracking device interfaces with a monitoring subsystem to create a tracking file, said tracking device transmits the event message to the monitoring subsystem, wherein the transmitter ID is extracted from the received event message and validity of the transmitter ID is ascertained based on a first set of rules, wherein further, a notification to a user terminal device is sent and a record of the event is created if the transmitter ID is invalid; an entity ID associated with the transmitter ID is determined based on a second set of rules if the transmitter ID is valid; and a tracking file is created for each event message to track the entity based on the entity ID.

11. A method for tracking an entity positioned at any location or moving through one or more transit points, said method comprising:
   receiving, by a first processor, one or more types of signaling functions associated with the entity from one or more sources in response to a code generated by an action performed on a transmitter device associated with the entity, wherein the code comprises a transmitter ID associated with an entity ID of the entity;
   evaluating, by the first processor, time difference between the time of receiving the code and time of occurrence of at least one type of signaling function in respect to a predetermined time difference, wherein computing the time of occurrence of the at least one type of signaling function comprises:
      retrieving the time of occurrence of the at least one signaling function from a first record of the signaling function;
      retrieving the time of occurrence of the at least one signaling function from a second record of the signaling function;
      mapping the first record of the at least one signaling function with the second record of the at least one signaling function; and
      computing exact time of occurrence of the at least one signaling function by comparing the time of occurrences retrieved from the first and the second records based on a predetermined time lag;
   generating, by the first processor, a timestamped record of at least one type of signaling functions in response to the results of the evaluation; and
   generating, by the first processor, an event message for creating a tracking file by processing the received code with tracking data, wherein the tracking data comprises one or more parameters associated with the entity and tracking device.

12. The method as claimed in claim 11, wherein generating the time stamped record of at least one type of signaling function comprises computing the time of occurrence of the at least one type of signaling function and ascertaining validity of said signaling functions based on the evaluated time difference.

13. The method as claimed in claim 11, wherein one or more sources associated with the entity include audio signal generator and light signal generator.

14. The method as claimed in claim 11, wherein the types of signaling functions associated with the entity include audio signals and lighting signals.

15. The method as claimed in claim 11, wherein the one or more parameters associated with the entity include entity location, type of signaling function, timestamped record of signaling function and pattern of signaling function.

16. The method as claimed in claim 15, wherein the one or more parameters associated with the tracking device include tracking device ID and tracking device location.

17. The method as claimed in claim 16, wherein the event message comprises received code, time of receiving the code, tracking device ID, tracking device location, entity location, type of signaling function, timestamped record of signaling function and pattern of signaling function.

18. The method as claimed in claim 11, wherein entity location is determined based on the location of the tracking device, wherein location of the tracking device is representative of location of the entity and one or more types of signaling functions associated with the entity.

19. The method as claimed in claim 11, wherein the entity location is determined based on the location of the signaling function, the signaling function being a lighting signal, determining the location of the entity comprises:
   retrieving location of the tracking device;
   capturing the coordinates of the lighting signals by analysing a video record of the lighting signal based on the location of the tracking device, said video record retrieved via a video surveillance device deployed at the transit point;
   analysing the layout of the transit point via the video surveillance device; and
   determining the exact slot number for the co-ordinates by mapping the coordinates of the lighting signals with the slot number, wherein the slot number is representative of the exact location of the entity.

20. The method as claimed in claim 11, wherein creating the tracking file includes,
   extracting, by a second processor, the transmitter ID from the received event message and ascertaining the validity of the transmitter ID based on a first set of rules, wherein further, a notification to a user terminal device is sent and a record of the event is created if the transmitter ID is invalid;

determining, by the second processor, an entity ID associated with the transmitter ID based on a second set of rules if the transmitter ID is valid; and creating, by the second processor, a tracking file for each event message to track the entity based on the entity ID.

21. The method as claimed in claim 11, wherein the tracking file includes tracking device ID, entity location, type of signaling function, event type, event time and entity ID associated with the entity.

22. The method as claimed in claim 11, wherein the first set of rules comprises ascertaining the validity of the extracted transmitter ID from a list of activated transmitter ID's maintained in a tracking log database.

23. The method as claimed in claim 11, wherein the second set of rules comprises mapping the extracted transmitter ID with the associated entity ID from a transmitter-_entity knowledge base to determine the entity ID.

24. A computer program product comprising:

a non-transitory computer-readable medium having computer-readable program code stored thereon, the computer-readable program code comprising instructions that, when executed by a processor, cause the processor to:

receive one or more types of signaling functions associated with the entity from one or more sources in response to a code generated by an action performed on a transmitter device associated with the entity, wherein the code comprises a transmitter ID associated with an entity ID of the entity;

evaluate time difference between the time of receiving the code and time of occurrence of the at least one type of signaling functions in respect to a predetermined time difference, wherein computing the time of occurrence of the at least one type of signaling function comprises:

retrieving the time of occurrence of the at least one signaling function from a first record of the signaling function;

retrieving the time of occurrence of the at least one signaling function from a second record of the signaling function;

mapping the first record of the at least one signaling function with the second record of the at least one signaling function; and computing exact time of occurrence of the at least one signaling function by comparing the time of occurrences retrieved from the first and the second records based on a predetermined time lag;

generate a timestamped record of at least one type of signaling function in response to the results of the evaluation; and generate an event message for creating a tracking file by processing the received code with tracking data, wherein the tracking data comprises one or more parameters associated with the entity and tracking device.

* * * * *